(12) United States Patent
Hackert et al.

(10) Patent No.: US 10,767,534 B2
(45) Date of Patent: Sep. 8, 2020

(54) METHOD FOR EMPTYING A REDUCING AGENT DELIVERY SYSTEM BELONGING TO AN SCR CATALYTIC CONVERTER

(71) Applicant: Robert Bosch GmbH, Stuttgart (DE)

(72) Inventors: Annabel Hackert, Leonberg (DE); Manuel Simon Reiter, Stuttgart (DE); Marc Ringeisen, Ceske Budejovice (CZ)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 16/308,553

(22) PCT Filed: Apr. 12, 2017

(86) PCT No.: PCT/EP2017/058730
§ 371 (c)(1),
(2) Date: Dec. 10, 2018

(87) PCT Pub. No.: WO2017/211484
PCT Pub. Date: Dec. 14, 2017

(65) Prior Publication Data
US 2019/0170038 A1    Jun. 6, 2019

(30) Foreign Application Priority Data
Jun. 10, 2016    (DE) .......... 10 2016 210 262

(51) Int. Cl.
*F01N 3/20* (2006.01)
*B01D 53/94* (2006.01)

(52) U.S. Cl.
CPC .......... *F01N 3/208* (2013.01); *F01N 3/2066* (2013.01); *B01D 53/94* (2013.01);
(Continued)

(58) Field of Classification Search
CPC .... F01N 3/208; F01N 3/2066; F01N 2610/02; F01N 2610/146; F01N 2610/1406;
(Continued)

(56) References Cited

U.S. PATENT DOCUMENTS 8,397,491 B2 *   3/2013  Bauer ................ F01N 3/2066
                                                137/558
8,920,757 B1 *  12/2014  Chandrapati ...... B01D 53/9495
                                                423/213.2
(Continued)

FOREIGN PATENT DOCUMENTS

CN      102748101 A     10/2012
DE      10254981         6/2004
(Continued)

OTHER PUBLICATIONS

DE-102009029408-A1 English Translation of Specification (Year: 2020).*
(Continued)

*Primary Examiner* — Timothy P. Kelly
*Assistant Examiner* — Stephanie A Shrieves
(74) *Attorney, Agent, or Firm* — Michael Best & Friedrich LLP

(57) ABSTRACT

The invention relates to a method for emptying a reducing agent delivery system belonging to an SCR catalytic converter, which comprises a delivery line and a return line, each line connecting a reducing agent tank to a delivery module, and which comprises a pressure line that connects the delivery module to a metering valve. The method comprises the following steps: closing (50) the metering valve, and switching the delivery module from a delivering function to a returning function, by switching (51) a switching valve from a first position to a second position. This enables a reducing agent solution to be returned (52) from
(Continued)

the return line, the delivery line and the delivery module by means of the delivery module and the delivery line into the reducing agent tank. Subsequently, the metering valve is opened (53) and a reducing agent solution is returned (54) from the metering valve and the pressure line, and also from the return line, via the delivery line into the reducing agent tank. Additionally, the metering valve is closed again (55) in order to empty (56) the return line and the delivery module.

8 Claims, 3 Drawing Sheets

(52) U.S. Cl.
CPC ...... *F01N 2550/05* (2013.01); *F01N 2610/02* (2013.01); *F01N 2610/144* (2013.01); *F01N 2610/1406* (2013.01); *F01N 2610/146* (2013.01); *F01N 2610/1473* (2013.01); *Y02T 10/24* (2013.01)

(58) Field of Classification Search
CPC ....... F01N 2610/1473; F01N 2610/144; F01N 2550/05; F01N 3/20; Y02T 10/24; B01D 53/94; B67D 7/0486
USPC .......................................................... 141/59
See application file for complete search history.

(56) References Cited

U.S. PATENT DOCUMENTS

| | | | |
|---|---|---|---|
| 2010/0058749 A1 | 3/2010 | Salamat | |
| 2013/0133310 A1* | 5/2013 | Liljestrand | F01N 3/2066 60/274 |
| 2014/0325961 A1* | 11/2014 | Yokota | F01N 3/208 60/274 |
| 2015/0047325 A1* | 2/2015 | Simon | F01N 3/2006 60/274 |
| 2015/0115051 A1* | 4/2015 | Van Vuuren | F01N 3/208 239/1 |

FOREIGN PATENT DOCUMENTS

| | | | | |
|---|---|---|---|---|
| DE | 102007028480 | | 12/2008 | |
| DE | 102009029408 | | 3/2011 | |
| DE | 102009029408 | A1 * | 3/2011 | ........... F01N 3/2066 |
| DE | 102011076429 | | 11/2012 | |
| DE | 102013210858 | | 12/2014 | |
| EP | 1836379 | | 9/2007 | |

OTHER PUBLICATIONS

International Search Report for Application No. PCT/EP2017/058730 dated Jun. 19, 2017 (English Translation, 3 pages).

* cited by examiner

METHOD FOR EMPTYING A REDUCING AGENT DELIVERY SYSTEM BELONGING TO AN SCR CATALYTIC CONVERTER

BACKGROUND OF THE INVENTION

The present invention relates to a method for emptying a reducing agent delivery system of an SCR catalytic converter. In addition, the present invention relates to a computer program which executes each step of the method according to the invention when it runs on a computing device, and a machine-readable storage medium which stores the computer program. Finally, the invention relates to an electronic controller which is configured to carry out the method according to the invention.

Nowadays, during the post-treatment of exhaust gases, the SCR (Selective Catalytic Reduction) method is used in order to reduce nitrogen oxides (NOx) in the exhaust gas. The SCR method is primarily used in motor vehicles. Here, a urea-water solution, commercially also known as AdBlue®, is introduced into the oxygen-rich exhaust gas. For this purpose, use is made of a metering module which comprises a nozzle in order to spray the urea-water solution into the exhaust gas stream. In addition, a metering valve is implemented, which is able to control the flow through the metering module. In the SCR catalytic converter, the urea-water solution reacts to form ammonia, which then binds to the nitrogen oxides, from which water and nitrogen are produced. The urea-water solution is pumped from a tank to the metering module via a delivery module. In addition, the delivery module is connected to the tank via a return, so that excess urea-water solution can be fed back. The urea-water solution must be removed from the system at the end of the journey since otherwise, above all at low outside temperatures, there is the risk of freezing the urea-water solution, which can lead to damage to the delivery module. Normally, the delivery module is emptied into the tank via the delivery line. In this case, the ventilation is carried out via the metering module and the pressure line. However, in the first seconds of the emptying process, the water component of the urea-water solution can evaporate, which leads to the urea crystallizing out. This can result in blockage of the metering module, in particular of the metering valve. If this is the case, the emptying of the delivery module via the pressure line is not possible and pressure equalization cannot be completed.

DE 10 2007 028 480 A1 describes an SCR device as presented above. Here, a second storage container for a reducing agent is additionally connected and is connected up as soon as the first storage container falls below a minimum filling quantity. The fluid is delivered to the metering module via a pump and can run back into the storage container via a return. The system manages without valves in the lines listed.

DE 102 54 981 A1 relates to a device for removing a reducing agent from an SCR system. The system has an additional compressed air pump and also two control valves and a return line. During emptying, in a first step the compressed air pump is connected via a control valve such that it first empties the metering valve, either into the mixing chamber of the exhaust gas tract or into the reducing agent reservoir. In the second step, the compressed air pump is connected via both control valves in such a way that the compressed air pump is able to empty the reducing agent line and the return line into the reducing agent reservoir. The arrangement in the second step is independent of the metering module. The device thus permits the emptying of a major part of the system, irrespective of the state of the metering module.

DE 10 2013 210 858 A1 relates to a method for operating a hydraulic delivery and metering system, in particular for a reducing agent in an SCR system which has a delivery path and a separate return path. There is a pump and two nonreturn valves each in both paths. When emptying the system, the return pump sucks the delivery path and the metering module empty. In addition, it is mentioned that, in the event of a defect in the return path, the pressure equalization can take place via the metering valve.

SUMMARY OF THE INVENTION

The method relates to a reducing agent delivery system of an SCR catalytic converter, which has a delivery line and a return line which each connect a delivery module to a reducing agent tank, the return line not dipping into the reducing agent solution of the reducing agent tank. In addition, it has a pressure line which connects the delivery module to a metering valve. A reversing valve can be switched between two positions. In a first position, the delivery module acts in the delivery mode, in a second position it is possible to switch over to return operation of the delivery module. In the delivery mode, reducing agent solution from the reducing agent tank is delivered via the delivery module into the pressure line and from there is led to the metering module. In addition, part of the reducing agent solution out of the delivery module is led back into the reducing agent tank via the return line. The return mode is used for emptying. The reducing agent solution is pumped back out of the system into the reducing agent tank by means of the delivery module.

At the start in the method, a pressure reduction is initiated in the pressure line. For this purpose, the metering valve, which controls the flow of reducing agent from the metering module through the pressure line, is closed. In addition, the changeover valve is changed over from a first position to a second position, so that the delivery module is changed over from the delivery mode to the return operation. The emptying process then begins. As a result of the closure of the metering valve and the operation of the delivery module in return operation, a negative pressure is produced in the pressure line. When the metering module is opened, it must be ensured that no positive pressure prevails in the pressure line, in order to prevent reducing agent solution from dripping into the exhaust gas tract. As soon as a negative pressure is achieved, the return line is emptied into the tank via the delivery line. By opening the metering valve, the metering valve and part of the pressure line can likewise be emptied via the delivery line, while the emptying of the return line proceeds at the same time. If the metering valve is closed, a defined state is brought about and, with the aid of the negative pressure, the remaining return line and also the delivery module and the delivery line can be emptied. This emptying method is independent of crystallization of the reducing agent solution in the metering valve, since the crystallization occurs only when the metering valve has already been closed again. Pressure equalization following the emptying is carried out via the emptied return line and the reducing agent tank.

According to a further aspect, provision can be made for a pump in the delivery module, after the latter has been changed over to return operation, to be operated with a first output. The first output can preferably lie between a level of utilization of the pump of 20% and 40%. The absolute pressure in the pressure line is reduced from an operating pressure at 8.5 bar to 11.5 bar to a pressure under 1 bar. If the pressure in the pressure line falls below a first pressure threshold value, preferably above 1 bar and below 2 bar, the emptying process is carried out. The pump is then operated with a second output, which is greater than the first. Preferably, the output lies in a range of the level of utilization of the pump of 60% to 100%. As a result, it is effectively possible to produce a negative pressure which leads to emptying of the return line.

Preferably, the pressure line is emptied into the reducing agent tank via the delivery line when the absolute pressure in the pressure line falls below a second pressure threshold value. In this way, it is possible to ensure that no positive pressure prevails in the pressure line.

A further aspect defines a first time period, after which the opened metering valve is closed again. Said time period preferably lies in a module range from 3 seconds to 15 seconds. Following the closure of the metering module, it is consequently possible to empty the return line. Furthermore, the delivery module can be emptied into the reducing agent tank via the delivery line.

Preferably, the pump is switched off after a second time period after the return line has been emptied. It is preferred for the second time period to lie in a range between 5 seconds and 15 seconds. In addition, the changeover valve can be switched into the first position again, that is to say to delivery operation. Preferably, this occurs after a predefined third time period after the pump has been switched off. The third time period can preferably be 3 seconds to 10 seconds. This has the advantage that the negative pressure which prevails in the delivery module can be compensated. The pressure compensation is carried out here via the empty return line and the reducing agent tank, instead of via the pressure line and the metering valve.

The computer program is configured to carry out each step of the method, in particular when it is carried out on a computing device or controller. It permits the implementation of the method in a conventional electronic controller without having to perform structural changes thereto. For this purpose, it is stored on the machine-readable storage medium.

By downloading the computer program onto a conventional electronic controller, the electronic controller according to the invention is obtained, which is configured to control the emptying of the reducing agent delivery system of an SCR catalytic converter by means of the method according to the invention.

BRIEF DESCRIPTION OF THE DRAWINGS

Exemplary embodiments of the invention are illustrated in the drawings and explained in more detail in the following description.

DETAILED DESCRIPTION

Figure 1:
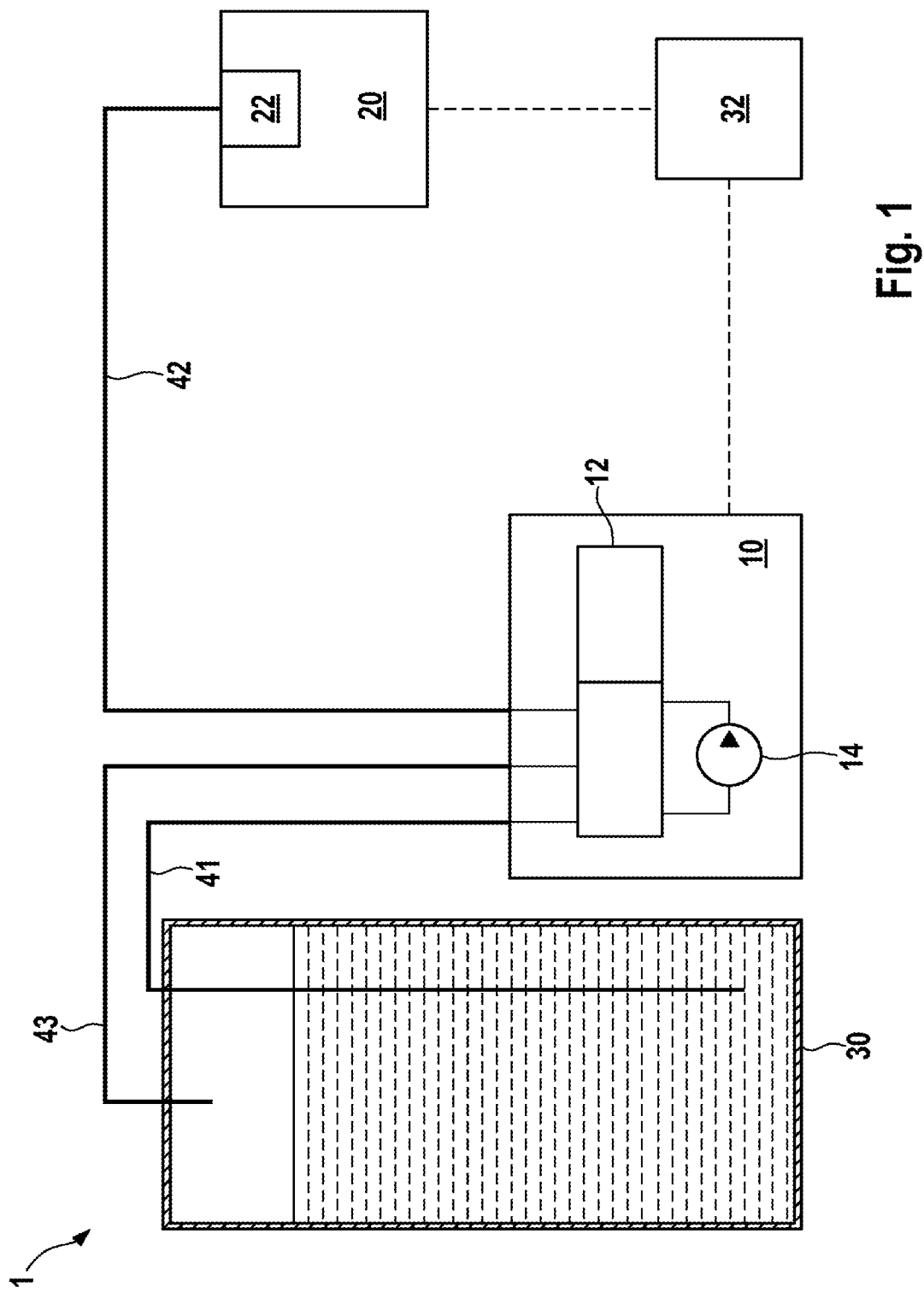
FIG. 1 shows, schematically, a reducing agent delivery system of an SCR catalytic converter, which can be emptied by means of an exemplary embodiment of the method according to the invention.

A reducing agent delivery system 1 of an SCR catalytic converter is illustrated in FIG. 1. It comprises a delivery module 10, which can be controlled with a changeover valve 12 and comprises a pump 14. The system also comprises a metering module 20, which comprises a metering valve 22 which sprays the reducing agent solution into an exhaust gas stream (not illustrated). In addition, the system comprises a reducing agent tank 30 and multiple lines. A delivery line 41 leads from the reducing agent tank 30 to the delivery module 10. The delivery module is connected to the metering valve 22 via a pressure line 42. In addition, a return line 43 leads back from the delivery module 10 into the reducing agent tank 30, wherein the return line 43 does not dip into the reducing agent solution of the reducing agent tank 30. The delivery module 10, including changeover valve 12 and the metering valve 22, is controlled via an electronic controller 32.

The changeover valve 12 can assume two positions. In a first position, the reducing agent delivery system 1 is in the delivery mode. Here, reducing agent solution is delivered by the pump 14 from the reducing agent tank 30 via the delivery line 41 into the delivery module 10 and, from there, is led onward via the pressure line 42 to the metering module 20, where it is sprayed into the exhaust gas stream by the metering valve 22. Excess reducing agent in the delivery module 10 can be fed back into the reducing agent tank 30 via the return line 43. In a second position of the changeover valve 12, the reducing agent delivery system 1 is switched to return operation. According to one exemplary embodiment of the method according to the invention, the reducing agent solution is delivered from the metering module 20, delivery module 10 and pressure line 42, delivery line 41 and return line 43 into the reducing agent tank 30 via the delivery line 41 by means of the delivery module 10.

Figure 2:
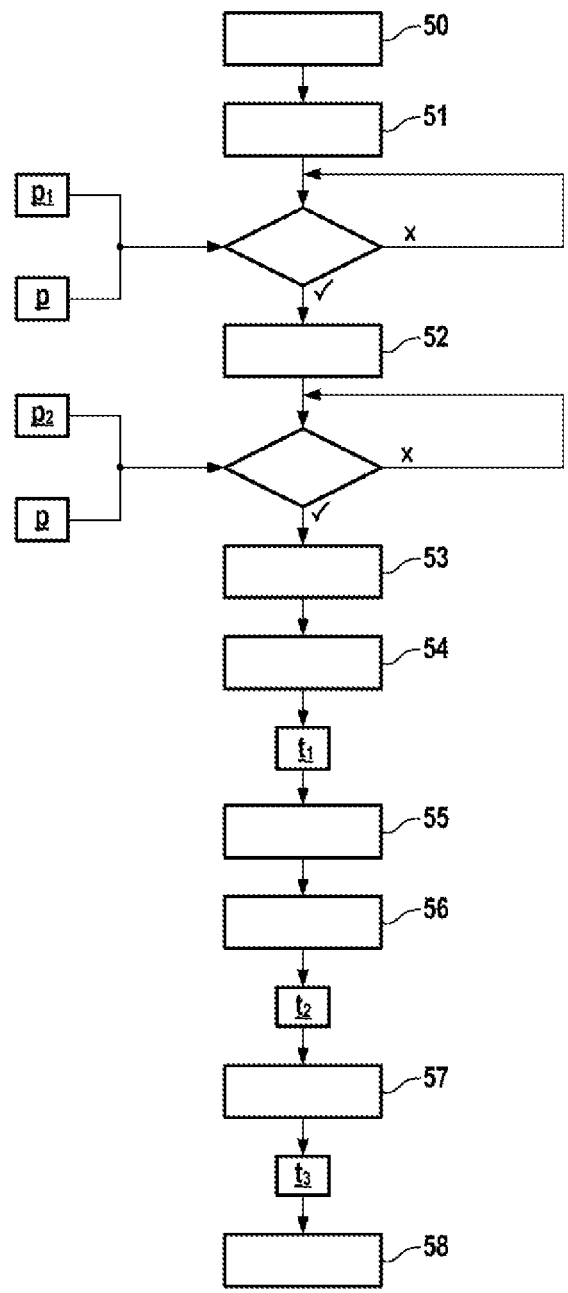
FIG. 2 shows a flowchart of an exemplary embodiment of the method according to the invention.

FIG. 2 illustrates a flowchart of the method according to the invention in an exemplary embodiment. In a first step 50, the metering valve is closed and a pressure reduction in the pressure line 42 is carried out. For this purpose, the changeover valve 12 is switched to the second position in a second step 51, so that the reducing agent delivery system 1 is in return operation. During the entire emptying process, the changeover valve 12 remains in the second position. Furthermore, with the metering valve 22 closed, the pump 14 is operated with a first output. This corresponds to a level of utilization μ of the pump 14 of 25%.

If the absolute pressure p in the pressure line 42 falls below a first pressure threshold value $p_1$, which is around 1.6 bar here (cf. FIG. 3), a third step 52 is carried out. In this first emptying phase, the pump 14 is operated with a second output, which corresponds to the level of utilization μ of the pump 14 of 75%. Accordingly, the second output is higher than the first output. As a result of the closed metering valve 22, a negative pressure is built up in the pressure line 42, and the return line 43 is emptied into the reducing agent tank 30 through the delivery module 10 and the delivery line 41.

As soon as the absolute pressure p in the pressure line 42 reaches a second pressure threshold value $p_2$, which falls below 1 bar (cf. FIG. 3), the metering valve 22 is opened in a fourth step 53 and the second emptying phase begins. In a further embodiment, the fourth step 53 and thus the second emptying phase can also proceed after a previously defined time period after the third step 52. Since exhaust gas from the exhaust gas tract (not shown) can then flow through the metering module 20 and the metering valve 22 into the pressure line 42, in the fifth step 54 the pump 14 ensures emptying of the pressure line 42, the metering module 20 and the metering valve 22 into the reducing agent tank 30 via the delivery module 10 and the delivery line 41. Meanwhile, a flow of reducing agent still always takes place through the return line 43.

The third emptying phase, in a sixth step 55, begins after a first time period $t_1$, which is 5 seconds, after the metering valve 22 has been opened in the fourth step 53. In the sixth step 55, the metering valve 22 is closed again until the emptying process has been concluded. A seventh step 56 follows, in which, in a similar way to that in the third step 52, the return line 43 is emptied into the reducing agent tank 30. In addition, here the delivery module 10 and the return line 43 are also emptied into the reducing agent tank 30 via the delivery line 41.

An eighth step 57 follows the seventh step 56 after a second time period $t_2$. In said step, the pressure equalization takes place in that air flows out of the reducing agent tank 30 into the reducing agent delivery system 1 via the return line 43, so that no negative pressure is enclosed. For this purpose, the pump 14 is switched off and the pressure equalization takes place via the emptied return line 43 and the reducing agent tank 30.

At the same time, in an eighth step 57, pressure equalization takes place. After a third time period $t_3$, the changeover valve 12 is switched back into the first position again in a ninth step 58, and the reducing agent delivery system is switched off.

Figure 3:
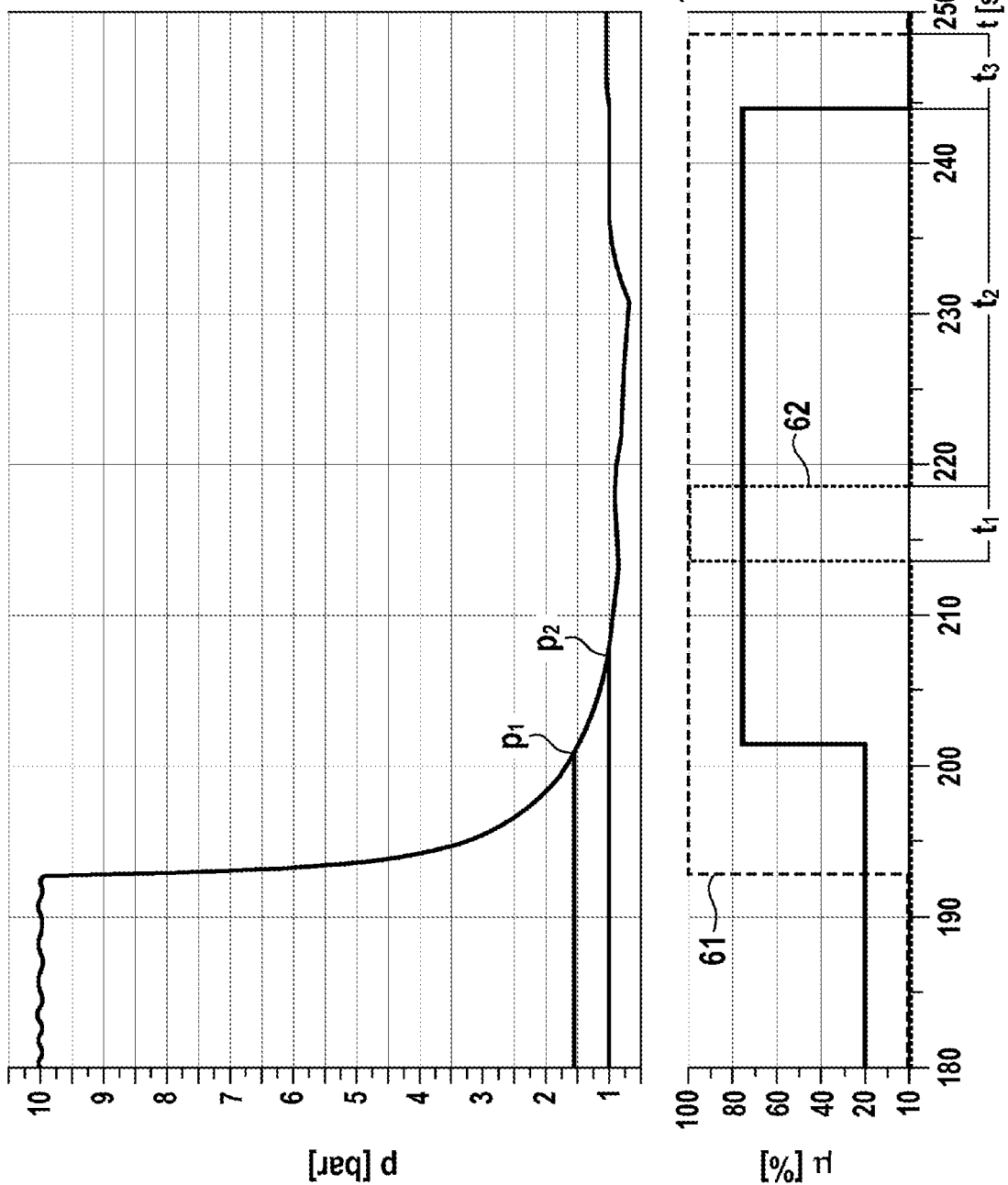
FIG. 3 shows a graph of the pressure (at the top) and of the switching states (at the bottom) of the changeover valve and of the metering valve and the level of utilization of the pump (at the bottom) over time, according to one embodiment of the method according to the invention.

FIG. 3 shows a graph, in the upper part of which the absolute pressure p is illustrated over time, and the switching state 61 of the changeover valve 12 and the switching state 62 of the metering valve 22 and also the level of utilization μ of the pump 14 over time are illustrated in the lower part. Here, in particular the pressure threshold values $p_1$ and $p_2$ and the time periods $t_1$, $t_2$ and $t_3$ are indicated.

In the operating mode, the absolute pressure p begins at an operating pressure of 10 bar. The switching state 62 of the metering valve 22 is closed, which is indicated here by a 0. In addition, the switching state 61 of the changeover valve 12 is in the first position. The level of utilization μ of the pump 14 is around 15%. After 24 seconds, the emptying method is started in accordance with the flowchart. The switching state 61 of the changeover valve 12 is changed over to the second position, that is to say to return operation. In the process, the level of utilization μ of the pump 14 increases to 25%. The pressure reduction leads to the absolute pressure p falling from 10 bar to less than 1 bar.

Beginning at a first pressure threshold value $p_1$, which here is around 1.6 bar, the emptying is initiated. The output of the pump 14 is maximized, which is identified here by the jump in the level of utilization μ of the pump 14 to 75%. The second pressure threshold value $p_2$ in this embodiment is therefore less than 1 bar during the transition of the absolute pressure p to a negative pressure, and is located at a time of 40 seconds. Now, according to the third step 52, the switching state 62 of the metering valve 22 is set to 1 and thus the metering valve 22 is opened. After the first time period $t_1$, the switching state 62 of the metering valve 22 is set back to 0 and thus the metering valve 22 is closed again. The first time period $t_1$, according to the embodiment which is illustrated in FIG. 3, is 5 seconds.

The second time period $t_2$ is 26 seconds in this case. After this time, the pump is switched off, so that the level of utilization μ of the pump 14 falls to 0%, by which means the emptying process is concluded. Then, pressure equalization is carried out over a third time period $t_3$, which is 5 seconds here. After this third time period $t_3$, the switching state 61 of the changeover valve 12 is set back to position 1 and the reducing agent delivery system 1 is switched off. The ninth step 58 is illustrated at 59 seconds in graph 3, so that the entire method 35 lasts for 35 seconds in this embodiment.

The invention claimed is:

1. A method for emptying a reducing agent delivery system (1) of an SCR catalytic converter which has a delivery line (41) and a return line (43), which each connect a reducing agent tank (30) to a delivery module (10), and a pressure line (42) which connects the delivery module (10) to a metering valve (22), comprising the following steps:
   closing (50) the metering valve (22);
   changing over the delivery module (10) from delivery operation to return operation by changing over (51) a changeover valve (12) from a first position to a second position;
   returning (52) a reducing agent solution from the return line (43) through the delivery module (10) and the delivery line (41) into the reducing agent tank (30);
   opening (53) the metering valve (22);
   returning (54) a reducing agent solution from the metering valve (22) and the pressure line (42) through the delivery line (41) into the reducing agent tank (30);
   closing (55) the metering valve;
   emptying (56) the return line and the delivery module via the delivery line (41) into the reducing agent tank (30); and
   carrying out pressure equalization (57) via the return line (43) from the reducing agent tank (30).

2. The method as claimed in claim 1, characterized in that, after the changeover (51), a pump (14) in the delivery module (10) is operated with a first output until a pressure (p) in the pressure line (42) falls below a first pressure threshold value ($p_1$), and the pump (14) is then operated with a second output, which is greater than the first output.

3. The method as claimed in claim 1, characterized in that the opening (53) of the metering valve (22) is carried out when a pressure (p) in the pressure line (42) falls below a second pressure threshold value ($p_2$).

4. The method as claimed in claim 1, characterized in that the opened metering valve (22) is closed (55) after a predefinable first time period ($t_1$) has elapsed.

5. The method as claimed in claim 4, characterized in that, following the closure (55) of the metering valve (22), the pump (14) is switched off (56) after a predefinable second time period ($t_2$) has elapsed.

6. The method as claimed in claim 5, characterized in that, after the pump (14) has been switched off (56), the changeover valve (12) is switched (58) into the first position again after a predefinable third time period ($t_3$) has elapsed.

7. A non-transitory machine-readable storage medium, on which a computer program is stored, wherein the computer program which is configured to carry out each step of the method as claimed in claim 1.

8. An electronic controller (32) which is configured to empty a reducing agent delivery system (1) of an SCR catalytic converter by a method as claimed in claim 1.

\* \* \* \* \*